G. W. JOHNSTON.
LIQUID MEASURING AND RECORDING DEVICE.
APPLICATION FILED MAY 8, 1919.
1,365,324.
Patented Jan. 11, 1921.
2 SHEETS—SHEET 1.
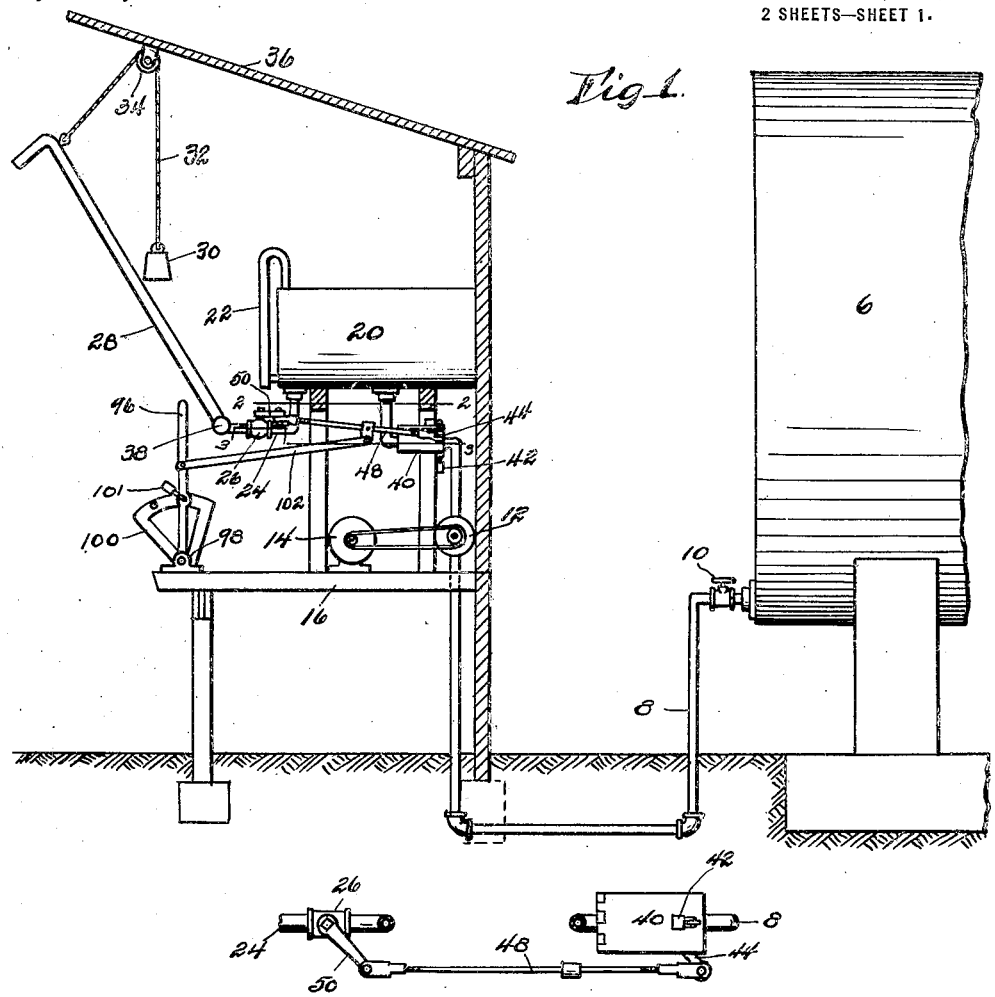
Fig. 1.
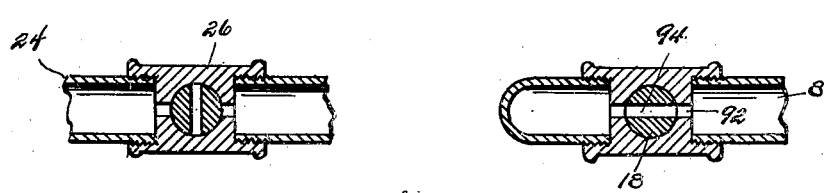
Fig. 2.
Fig. 3.
Witness:
R. E. Hamilton
INVENTOR:
Geo. W. Johnston,
BY
Chas. W. Gerard.
ATTORNEY

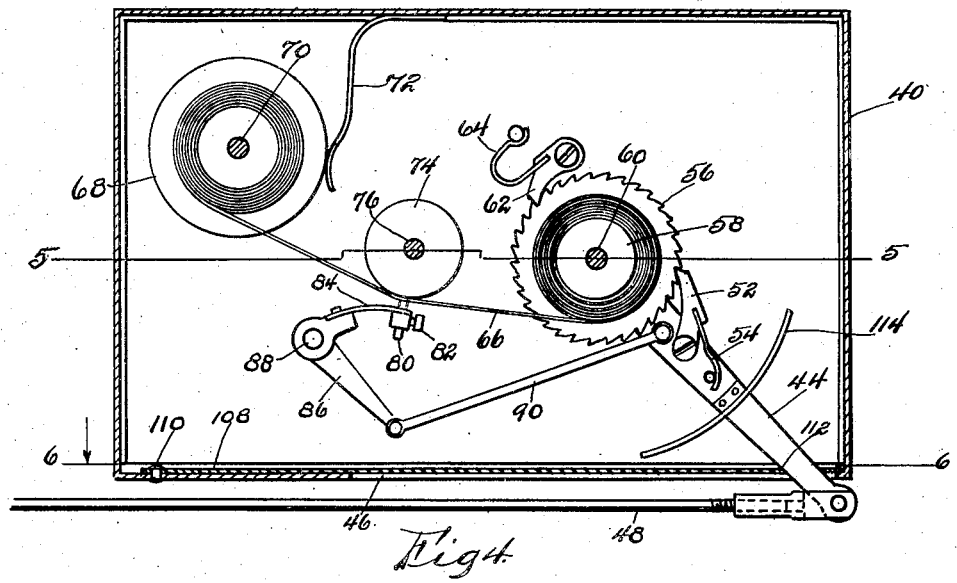
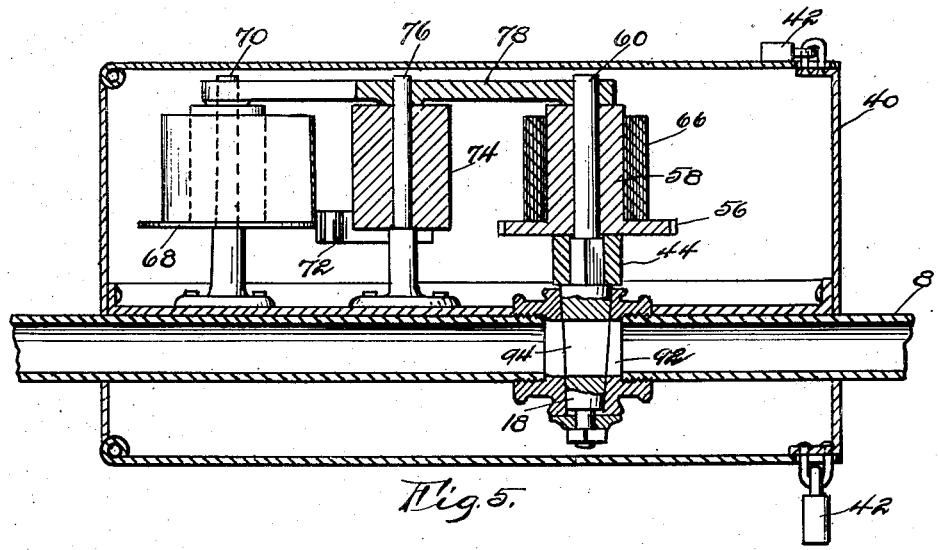
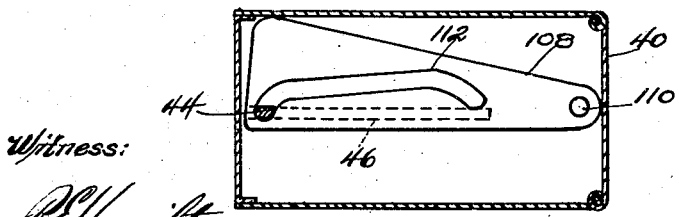

UNITED STATES PATENT OFFICE.

GEORGE W. JOHNSTON, OF ST. JOSEPH, MISSOURI, ASSIGNOR, BY MESNE ASSIGNMENTS, OF ONE-HALF TO EDWARD E. PEEL.

LIQUID-MEASURING AND RECORDING DEVICE.

1,365,324.   Specification of Letters Patent.   Patented Jan. 11, 1921.

Application filed May 8, 1919. Serial No. 295,533.

*To all whom it may concern:*

Be it known that I, GEORGE W. JOHNSTON, a citizen of the United States, residing at St. Joseph, in the county of Buchanan, State of Missouri, have invented certain new and useful Improvements in Liquid-Measuring and Recording Devices, of which the following is a complete specification.

The present invention relates to fluid measuring devices and aims to provide an improved apparatus of this character adapted for use with either liquids or gases, but particularly designed for supply stations for the measurement of oils or gasolenes.

One of the objects of the invention, therefore, is to devise a novel arrangement and construction of measuring means whereby all the fluid passing through the same is always measured and accurately accounted for. In this special application it is sought to provide a measuring apparatus for oil and gasolene supply stations by the operation of which the waste and losses incurred by present systems, such as those due to leakage and careless handling, will be practically eliminated, it being further sought to guard against the possibility of loss or waste due to irregularities in the dispensing of the fluid. For this purpose I provide a measuring tank provided with filling and discharge valves connected for simultaneous operation and so arranged that the filling valve may not be opened until the discharge valve is entirely closed.

It is also an object of the invention to provide a recording mechanism associated with the measuring apparatus and so connected as to record each opening movement of the filling valve.

It is also sought to devise a simple and efficient construction for embodying the proposed improvements, which may be applied to the apparatus now in use at supply or service stations.

With these general objects in view, together with minor objects which will appear in the course of the detailed description, the invention will now be described with reference to the accompanying drawings, illustrating one form of construction which I have provided for embodying the same, after which the novel features therein will be set forth and defined in the appended claims.

In the drawings—

Figure 1 is a side elevation showing a supply station having a fluid measuring and recording apparatus constructed in accordance with the present invention:

Fig. 2 is an enlarged sectional plan view, taken on the line 2—2 of Fig. 1;

Fig. 3 is a broken section taken on the line 3—3 of Fig. 1, on a still larger scale and showing the relative position of the filling and discharge valves when the latter is closed;

Fig. 4 is an enlarged horizontal sectional view of the recording mechanism, showing the position of the parts at the end of a recording operation;

Fig. 5 is a section taken on the line 5—5 of Fig. 4; and

Fig. 6 is a section (on a reduced scale) taken on the line 6—6 of Fig. 4.

Referring to the drawings in detail, these illustrate the improvements in connection with a supply station comprising a supply or storage tank 6 provided with an outlet pipe 8 fitted with the valve 10 and any suitable form of pump 12 driven from a motor 14 mounted on the platform 16. The said outlet pipe 8 is further provided with a control valve 18 by which the supply to a dispensing or measuring tank 20 is regulated, said tank being equipped with a suitable sight gage 22. The discharge from said tank takes place through an outlet or discharge pipe 24 fitted with a discharge valve 26, the end of the pipe 24 carrying a swinging service pipe 28 held normally in elevated position by means of a counterweight 30 and cable 32 operating over a sheave wheel 34 suspended from overhanging framework 36, thus permitting the pipe 28 to be conveniently lowered for filling service tanks in the usual manner, in which lowered position it automatically opens a valve 38 at the outer end of the pipe 24.

That portion of the pipe 8 which carries the valve 18 is housed within a metallic casing 40 having hinged top and bottom sections adapted to be locked by means of suitable locks 42. The valve 18 is provided with a valve operating arm 44 extending out through a slot 46 in one side of said casing 40, the outer end of said arm 44 being provided with an adjustable connecting rod 48 joining said arm with an arm 50 by which the valve 26 is operated. The arm 44 also carries a pawl 52 held by a spring 54 in engagement with a ratchet wheel 56 which is formed on one end of a spool 58 mounted on a spindle 60 formed as a part of the stem of the valve 18. The ratchet wheel 56 is thus actuated by the movements of the valve arm 44, and is retained against backward movement by means of a second ratchet pawl 62 held by a spring 64 in engagement with said wheel. The spool 58 is adapted to receive and feed a strip of paper 66 from another spool 68 mounted on a spindle 70 and turning frictionally against the action of a spring 72, the intermediate portion of said paper being engaged by a roller 74 journaled on a spindle 76. Both spools 58 and 68 and the roller 74 are retained on their spindles by means of a bar 78 mounted on the upper ends of all three spindles.

The paper 66 is adapted to be marked at the beginning of each opening movement of the valve 18 by operation of the arm 44, this marking or recording means comprising a marker 80 retained by a set screw 82 in one end of a spring arm 84 which is carried by a lever 86 fulcrumed at 88 and having an operating connection 90 with a point on the lever 44. The arrangement is such that the first part of each operative movement of the arm 44 begins the feeding of the paper on to the spool 58 and then just as the valve 18 starts to open the marker 80 is brought into engagement with the paper at the roller 74, the feeding of said paper of course continuing throughout the movement of said arm 44. The object is to prevent any opening of the valve 18 without recording such opening movement of the valve on the paper 66.

The arrangement of the valves 18 and 26 and their operating connections is also such that the valve 18 can never be opened to the slightest degree until after the valve 26 has been entirely closed. By referring to Figs. 2 and 3, it will be apparent that when a simultaneous movement is imparted to the valves 18 and 26, a very small movement, relatively, will be necessary to bring the valve 18 out of register with its port 92, whereas a considerably greater movement will be required to bring the valve 26 into register with its valve port. Similarly, with the valve 18 in fully closed position and the valve 26 in fully open position, and with the same operative movement, a very small extent of movement will be required to bring the valve 26 out of register with its valve port while a movement of considerably greater extent, relatively, will be required of the valve 18 before it begins registering with its port 92. By this means it is rendered certain that no fluid can be withdrawn by the operation of the valve mechanism without there being a record of such operation produced by the marking means above described.

A hand lever 96 may be provided at any suitable point for operating the valve mechanism, this lever being mounted on a bracket 98 formed with a lock segment 100 provided with a lock 101 for holding the lever in either of its positions, said lever having a rod 102 connecting the same with the rod 48 by which the valves are simultaneously operated.

A swinging guard member 108 is pivoted at 110 to one side of the housing 40 and provided with an irregular slot 112 for engagement with the lever 44, whereby the parts within the housing are protected (in any position of said lever) against any tool being inserted through the slot 46 for tampering with the recording mechanism. For further protection in this respect the lever 44 also carries an arcuate shield 114 intermediate the side of the housing and the pawl 52.

It will be understood that all pivotal and other connections in the valve operating and recording mechanism will be made in a permanent and non-detachable manner so as not to be disconnected without marring the parts.

In the operation of the apparatus it is contemplated that each plant or supply station equipped with the improved measuring and recording means will be in charge of a trusted employee who will take care of the equipment and keep the usual record of service rendered by that particular plant to tank drivers, etc., this service or the number of operations of the measuring tank 20 being also automatically recorded by the mechanism already described. The particular plant or supply station, however, will comprise only one of a number of such stations which will be in charge of a trusted officer of the company operating the plants, this officer making periodical trips over his territory or circuit and being provided with a key for obtaining access to the recording mechanism whereby he checks the amount of oil or gasolene delivered by each station. Obviously the construction of the apparatus is such that no subordinate employee or any driver can so tamper with or manipulate the measuring mechanism as to obtain fraudulently an unauthorized supply of oil or gasolene from the tank, and it will be apparent that every operation of the valve mechanism means a recording of the operation and a charge against the proper parties for the volume or capacity of the measuring tank 20.

While I have herein shown and described what I now regard as the preferred form of embodiment of the proposed improvements, I desire to reserve the right to make such formal changes or modifications as may fairly fall within the scope of the appended claims.

Having described the invention, what I claim and desire to secure by Letters-Patent is:

1. An apparatus of the character described comprising a measuring tank, a filling pipe for said tank provided with a filling valve, a recording mechanism associated with said filling valve, a discharge outlet from said tank provided with a discharge valve, and means for simultaneously operating said valves arranged to completely close said discharge valve prior to any opening of said filling valve, said recording mechanism being actuated by said valve-operating means to produce a record simultaneously with the initial opening movement of said filling valve.

2. An apparatus of the character described comprising a measuring tank, a filling pipe for said tank provided with a filling valve, means for operating said valve, a recording mechanism actuated by said valve-operating means, said recording mechanism operating to produce a record simultaneously with the initial opening movement of said valve, and a protecting housing completely inclosing said filling valve and recording mechanism.

3. An apparatus of the character described comprising a measuring tank, a filling pipe for said tank provided with a filling valve, a recording mechanism associated with said filling valve, a discharge outlet from said tank provided with a discharge valve, means for simultaneously operating said valves arranged to completely close said discharge valve prior to any opening movement of said filling valve, said recording mechanism being actuated by said valve-operating means to produce a record simultaneously with the initial opening movement of said filling valve, and a protecting housing completely inclosing said filling valve and recording mechanism.

4. An apparatus of the character described comprising a measuring tank, a filling pipe for said tank provided with a filling valve and a protecting housing inclosing said valve, a discharge outlet from said tank provided with a discharge valve, and means for simultaneously operating said valves arranged to completely close said discharge valve prior to the opening of said filling valve, said means including a lever extending through said housing and connected with said filling valve, said housing being provided with a slot for accommodating the movement of said lever and also with a guard member movable across said slot and provided with an irregular slot for accommodating said lever, said guard member being actuated by said lever to maintain said first slot closed for all positions of said lever.

In witness whereof I hereto affix my signature.

GEORGE W. JOHNSTON.